United States Patent
Lipetz et al.

(10) Patent No.: US 7,962,880 B2
(45) Date of Patent: Jun. 14, 2011

(54) WIRE STRUCTURES MINIMIZING COUPLING EFFECTS BETWEEN WIRES IN A BUS

(75) Inventors: Daniel Lipetz, Flushing, NY (US); Joshua M. Weinberg, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 12/035,506

(22) Filed: Feb. 22, 2008

(65) Prior Publication Data
US 2009/0217229 A1    Aug. 27, 2009

(51) Int. Cl.
*G06F 17/50* (2006.01)
(52) U.S. Cl. .................. 716/126; 716/129; 716/130
(58) Field of Classification Search ............ 716/5, 8–15, 716/126, 129, 130
See application file for complete search history.

(56) References Cited

U.S. PATENT DOCUMENTS

| | | | |
|---|---|---|---|
| 5,297,094 A * | 3/1994 | Rastegar | 365/225.7 |
| 6,189,133 B1 | 2/2001 | Durham et al. | |
| 6,388,277 B1 | 5/2002 | Kobayashi et al. | |
| 6,772,406 B1 | 8/2004 | Trimberger | |
| 6,999,375 B2 | 2/2006 | Jung et al. | |
| 2005/0216876 A1 | 9/2005 | Proebsting et al. | |
| 2006/0143586 A1 | 6/2006 | Suaya et al. | |
| 2006/0236290 A1 * | 10/2006 | Makino | 716/12 |
| 2007/0226673 A1 * | 9/2007 | Habitz et al. | 716/14 |

* cited by examiner

*Primary Examiner* — Vuthe Siek
(74) *Attorney, Agent, or Firm* — William A. Kinnaman, Jr.

(57) ABSTRACT

A method for minimizing coupling capacitance between wires in a bus comprising shifting by rearranging the order of said wires in said bus so that, aside from said first and last wires in said arrangement, the coupling capacitance across said bus is uniform and minimized relative to the original arrangement. Alternatively, a method for minimizing coupling capacitance between wires in a bus comprising shifting by rearranging the order of said wires in said bus so that, aside from said first and last wires in said arrangement, one of said wires incurs the smallest possible amount of coupling capacitance and then the coupling capacitance across the rest of said wires in said bus gets progressively worse relative to the original arrangement.

11 Claims, 8 Drawing Sheets

| SHIFT IN THE X DIRECTION | | | | | | | | | | | |
|---|---|---|---|---|---|---|---|---|---|---|---|
| WIRE OF BIT | 0 | 1 | 2 | 3 | 4 | 5 | 6 | 7 | 8 | 9 | COUPLED BITS |
| WIRE0 | ▨ | ▨ | ▨ | ▨ | ▨ | | | | | | - |
| WIRE1 | | ▨ | ▨ | ▨ | ▨ | ▨ | | | | | 8 |
| WIRE2 | | | ▨ | ▨ | ▨ | ▨ | ▨ | | | | 8 |
| WIRE3 | | | | ▨ | ▨ | ▨ | ▨ | ▨ | | | 8 |
| WIRE4 | | | | | ▨ | ▨ | ▨ | ▨ | ▨ | | 8 |
| WIRE5 | | | | | | ▨ | ▨ | ▨ | ▨ | ▨ | - |

MINIMUM COUPLING: 8
MAXIMUM COUPLING: 8

At this point in the algorithm...
tmp = 0
end = 2
i = 2
N = 3
ArrayOut = 1,3,x
ArrayIn = 1,2,3
middle = 2

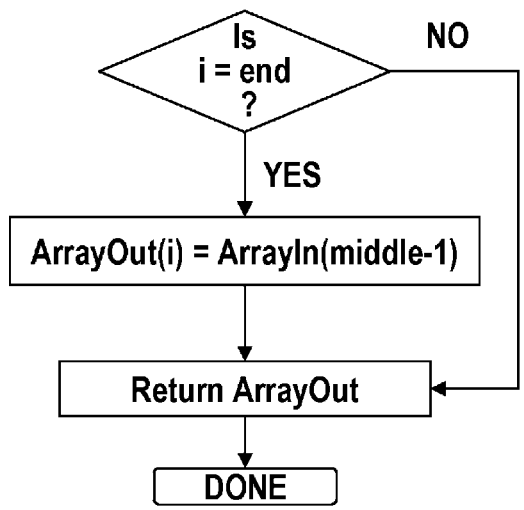

Is 'i' (i = 2) equal to 'end' (end = 2) ? If YES, then follow the YES leg of the decision block.

ArrayOut(i) = ArrayIn(middle-1)
→ArrayOut(2) = ArrayIn(2-1) = 2
→ArrayOut = 1,3,2

Return ArrayOut
→ArrayOut = 1,3,2 is returned to the main program calling this function.

The returned array contains the final optimized wire ordering.
1,2,3 was transformed into 1,3,2.

FIG. 3D

WIRE STRUCTURES MINIMIZING COUPLING EFFECTS BETWEEN WIRES IN A BUS

BACKGROUND OF THE INVENTION

1. Field of the Invention

This invention relates to methods for resolving problems caused by coupling effects between neighboring wires, and particularly to adjusting the effects of inductive coupling and/or capacitive coupling in bus lines.

2. Description of Background

Heretofore, in many cases busses in integrated circuits have been shifted a certain number of bits in the horizontal or vertical direction. This is commonly done in shifters, multipliers, and unit wiring. FIGS. 1A and 1B illustrate a common, i.e. normal, way people and tools wire provide the shifting of wiring FIG. 1A is a table illustrating the shifting of six wires in an array of busses between two stages of a prior art integrated circuit device. FIG. 1B illustrates a prior art example of the physical configuration of the busses of the table in FIG. 1A. The order for N wires in the vertical directions is 0,1,2, 3, . . . , N−1, For N wires in the bus and a shift or throw of length L bits there are (L−1)*2 of bits of neighboring wire for each wire aside from the periphery of the lines in the bus.

From the point of view of the problems associated with coupling capacitance and noise, this is undesirable. Any given wire is completely surrounded by neighbors that are usually hostile, i.e. cross talk is created by induction, which degrades the signal to noise ratio and slows down signal propagation especially when common timing signals are employed thereon. For N wires in a bus and a shift or throw of length L bits there is (L−1)*2 bits of neighboring wire for each wire. This provides the maximum amount of coupling capacitance due to proximity of wires to each other. For example, consider a system with ten wires, shifting fourteen bits. This assumes that there is no freedom to space wires out and that the designer or tool has the exact amount of wiring tracks as wires.

U.S. Patent Application Publication No. 2006/0143586 of Suaya entitled "Synthesis Strategies Based on the Appropriate use of Inductance Effects" describes optimizing the signal propagation speed on a wiring layout.

U.S. Pat. No. 7,139,993 of Proebsting entitled "Method and Apparatus for Routing Differential Signals Across a Semiconductor Chip" provides an arrangement of pairs of wires carrying differential signals across a semiconductor chip with those pairs of wires organized within a set of parallel tracks on the chip.

U.S. Pat. No. 6,999,375 of Jung entitled "Synchronous Semiconductor Device And Method Of Preventing Coupling Between Data Buses" describes a synchronous semiconductor device and a method for preventing coupling between data buses.

U.S. Pat. No. 6,772,406 of Trimberger entitled "Method For Making Large-Scale ASIC Using Pre-Engineered Long Distance Routing Structure" describes optimal routing line segments and associated buffers.

U.S. Pat. No. 6,388,277 of Kobayashi entitled "Auto Placement and Routing Device and Semiconductor Integrated Circuit" provides an auto placement and routing device that lays out wiring with consideration for influences of an increase in an effective coupling capacitance.

U.S. Pat. No. 6,189,133 of Durham, which is assigned to IBM, entitled "Coupling Noise Reduction Technique Using Reset Timing" describes reducing false transitions resulting from capacitive coupling between parallel interconnects driven by dynamic circuits by classifying interconnects based on the timing of expected data transitions in the signals they carry.

SUMMARY OF THE INVENTION

The shortcomings of the prior art are overcome and additional advantages are provided through the provision of an improved method of shifting wires in a bus to minimize problems caused by coupling effects between neighboring wires, including adjusting the effects of inductive coupling and/or capacitive coupling in bus lines. Only wires running horizontally are considered to contribute to coupling capacitance because they are spaced closely. The vertical components of the wires are not considered as they are relatively distant from each other thus the coupling is negligible.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

In accordance with this invention a method and a program product are provided for minimizing coupling capacitance between wires in a bus. The method and program product assume the prior art arrangement of wires in a bus. The method and program product then achieve desired minimization by rearranging positions of the wires in said bus so that, aside from the first and last wires in the resulting arrangement, a subset of the wires receive a drastic minimization relative to the remaining wires. More specifically, one wire has a minimum amount of coupling capacitance, and each other wire has progressively more coupling capacitance. Preferably, there are N wires in a bus shifting a length L, the method and program product rearranges the order of the wires resulting in a pattern of 0, (N−1), 1, (N−2), 2, . . . , (N/2)−1, N/2. The above pattern is for even values of N. For odd values of N, the order is determined to be 0, (N−1), 1, (N−2), . . . , Ceiling (N/2), Floor(N/2).

TECHNICAL EFFECTS

The technical effect of software used in the invention is to provide improved arrangements of wires shifted in a bus thereby minimizing problems caused by coupling effects between neighboring wires, including adjusting the effects of inductive coupling and/or capacitive coupling in bus lines.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1A is a table illustrating the shifting of six wires in a bus between two stages of a prior art integrated circuit device. FIG. 1B illustrates a prior art example of the physical configuration of the bus in the table in FIG. 1A.

FIG. 2A is a table illustrating the arrangement of the three wires WIRE0, WIRE1, and WIRE2 in the bus that is shifting from the output terminals LL1, LL2, and LL3 to the input terminals LL4', LL5' and LL6' between the two successive stages of the integrated circuit device. FIG. 2B illustrates an example of the physical configuration of the paths of the wires WIRE0, WIRE1, and WIRE2 in the bus with the intermediate shift in the path of WIRE1 which crosses WIRE2 and then re-crosses WIRE 2 so that there is a gap of 2X between the adjacent wires WIRE0 and WIRE1 in the horizontal runs thereof as shown in the table in FIG. 2A with a gap of 1× between WIRE2 and each of WIRE0 and WIRE1 in the horizontal runs thereof. The three wires WIRE0, WIRE1, and WIRE2 extend, initially, in parallel in an output array (upper vertical lines in FIG. 2B) from the output terminals LL1, LL2, and LL3. The wires WIRE0, WIRE1, and WIRE2 extend in that order from the output terminals LL1, LL2, and LL3 until they reach a set of points at which they extend at right angles in a transverse parallel array WIRE0, WIRE2, and WIRE1, i.e. with WIRE2 sandwiched between WIRE0 and WIRE1 (horizontal lines in FIG. 2B). Then the three wires WIRE0, WIRE1, and WIRE2 reach a second set of points at which they extend in a parallel input array (lower vertical lines in FIG. 2B). The input array is parallel to the direction of the output array but shifted to the right in FIG. 2B. The three wires WIRE0, WIRE1, and WIRE2 extend in that direction reaching contact with the input terminals LL4', LL5' and LL6' in that order. The three wires WIRE0, WIRE1, and WIRE2 reach the three input terminals LL4', LL5' and LL6 in the original order WIRE0, WIRE1, WIRE2 but with a greater gap between WIRE0 and WIRE1 in the region of the transverse parallel array. That greater gap exists because WIRE1 has crossed WIRE 2 twice since the output parallel array WIRE2 is 1× shorter than WIRE1 and 1× longer than WIRE0, but in the input parallel array WIRE2 is 1× shorter than WIRE0 and 1× longer than WIRE1.

FIGS. 3B-3D show how the algorithm of FIG. 3A applies to the example of FIGS. 2A and 2B.

FIG. 4A is a table illustrating the rearrangement of six wires in a bus that is shifting between two stages of an integrated circuit device. FIG. 4B illustrates an example of the physical configuration of the busses in the table in FIG. 4A.

FIG. 5A is a table illustrating the rearrangement of six wires in a bus that is shifting between two stages of an integrated circuit device. FIG. 5B illustrates an example of the physical configuration of the busses in the table in FIG. 5A.

The detailed description explains the preferred embodiments of the invention, together with advantages and features, by way of example with reference to the drawings.

DETAILED DESCRIPTION OF THE INVENTION

Figures 1A, 1B:
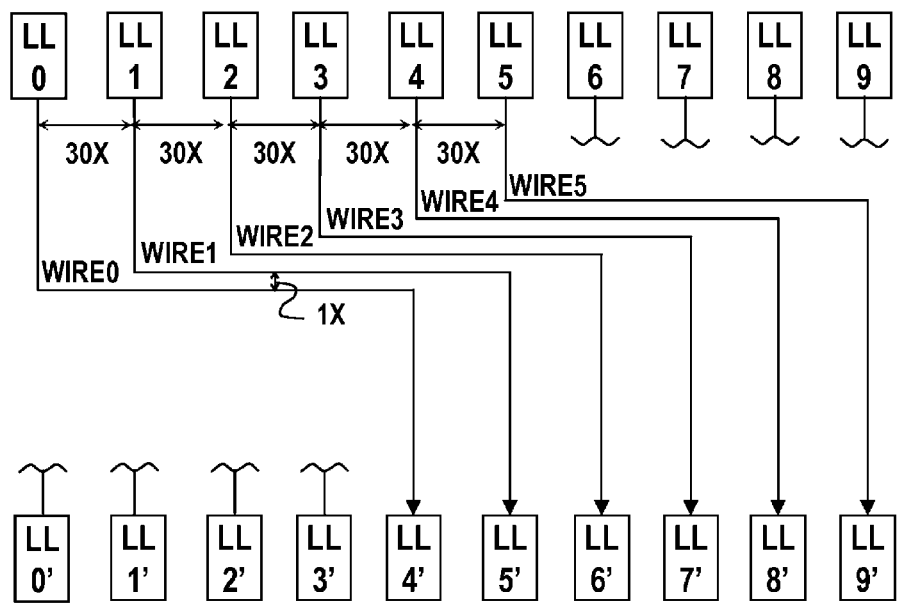
FIGS. 1A and 1B illustrate a common, i.e. normal, way people and tools arrange the wires for a bus that is shifting.
Figures 2A, 2B:
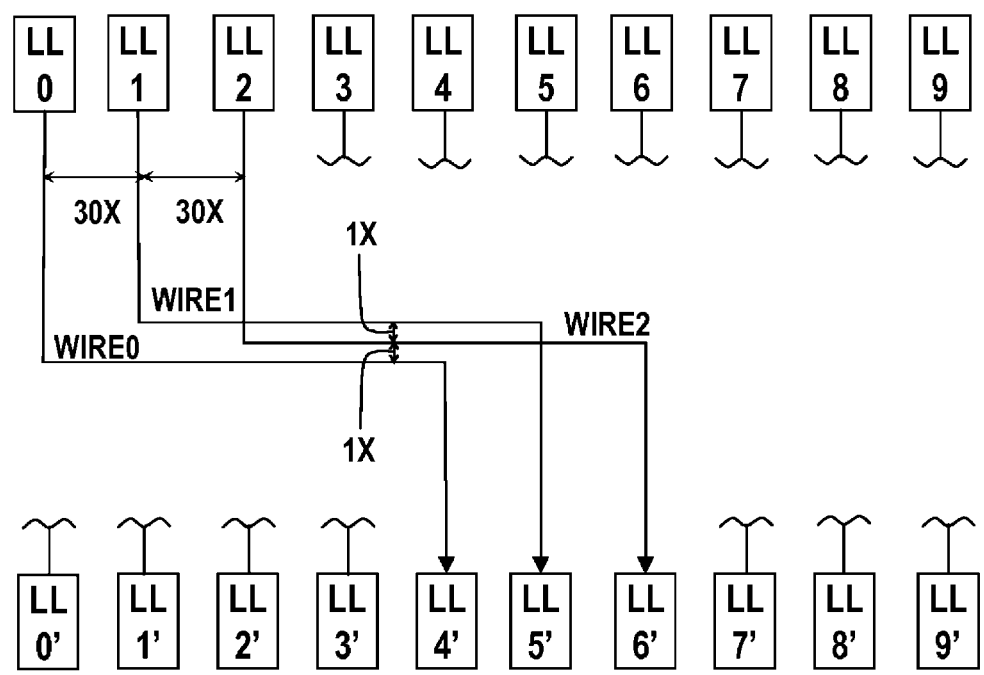
FIGS. 2A and 2B illustrate a simple three wire example of a structure provided in accordance with this invention formed by employing a method in accordance with this invention of rearranging the paths of an array of three wires WIRE0, WIRE1, and WIRE2 in a bus interconnecting an array of terminals LL1, LL2 and LL3 to an array of terminals LL4', LL5' and LL6' between two successive stages of an integrated circuit device.

Turning now to the drawings in greater detail, it will be seen that FIGS. 2A and 2B illustrate a structure in accordance with this invention which was provided by employing a method in accordance with this invention of rearranging the paths of three exemplary wires connected between including the wire of bit 0 (WIRE0), the wire of bit 1 (WIRE1) and the wire of bit 2 (WIRE2) in a bus connected in the same sequence or order respectively from output terminals LL0, LL1 and LL2 to input terminals LL4', LL5' and LL6'. The method of this invention as illustrated by FIGS. 2A and 2B provides for the intermediate shifting of the paths of the wires WIRE0, WIRE1 and WIRE2 between those output terminals LL0, LL1 and LL2 and those input terminals LL4', LL5' and LL6' without changing the sequence of connections provided by the wires WIRE0, WIRE1 and WIRE2 even though WIRE 2 shifts its path and returns its path into the original sequence of wires as it crosses over WIRE 1 twice, which in fact is in accordance with the method of this invention and which provides a structure in accordance with this invention. The invention employs an algorithm that can be manifested in software that minimizes the adversity of the coupling effect by neighboring wires WIRE0 WIRE1 and WIRE2. FIG. 2A is a table illustrating the rearrangement of three wires WIRE0 WIRE1 and WIRE2 in the bus that is the intermediate shifting of the path of WIRE2 between two stages of an integrated circuit device. FIG. 2B illustrates an example of the physical configuration of the busses in the table in FIG. 2A.

Figure 3A:
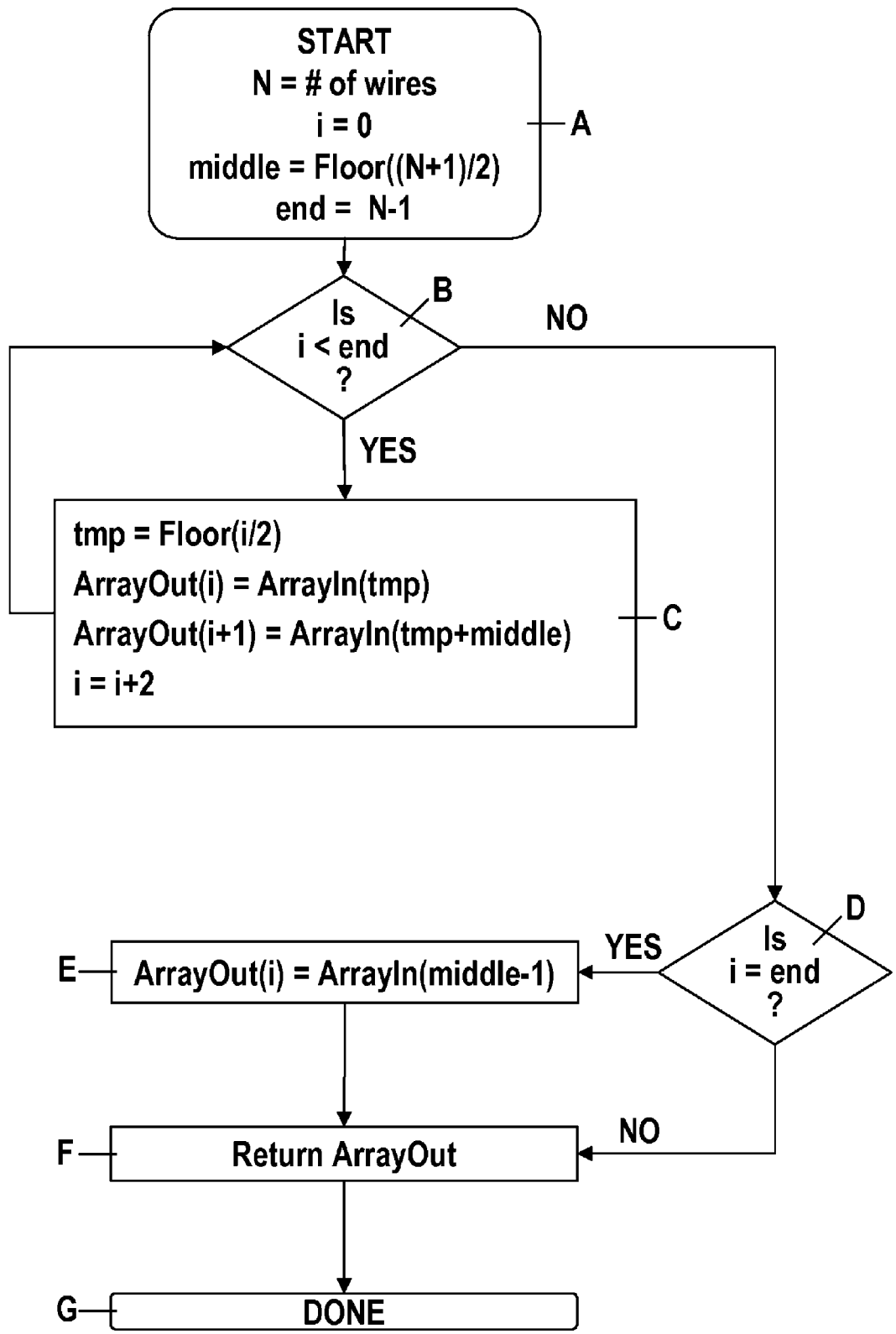
FIG. 3A is a flow chart of an algorithm for rearranging wires in accordance with this invention.
Figure 3B:
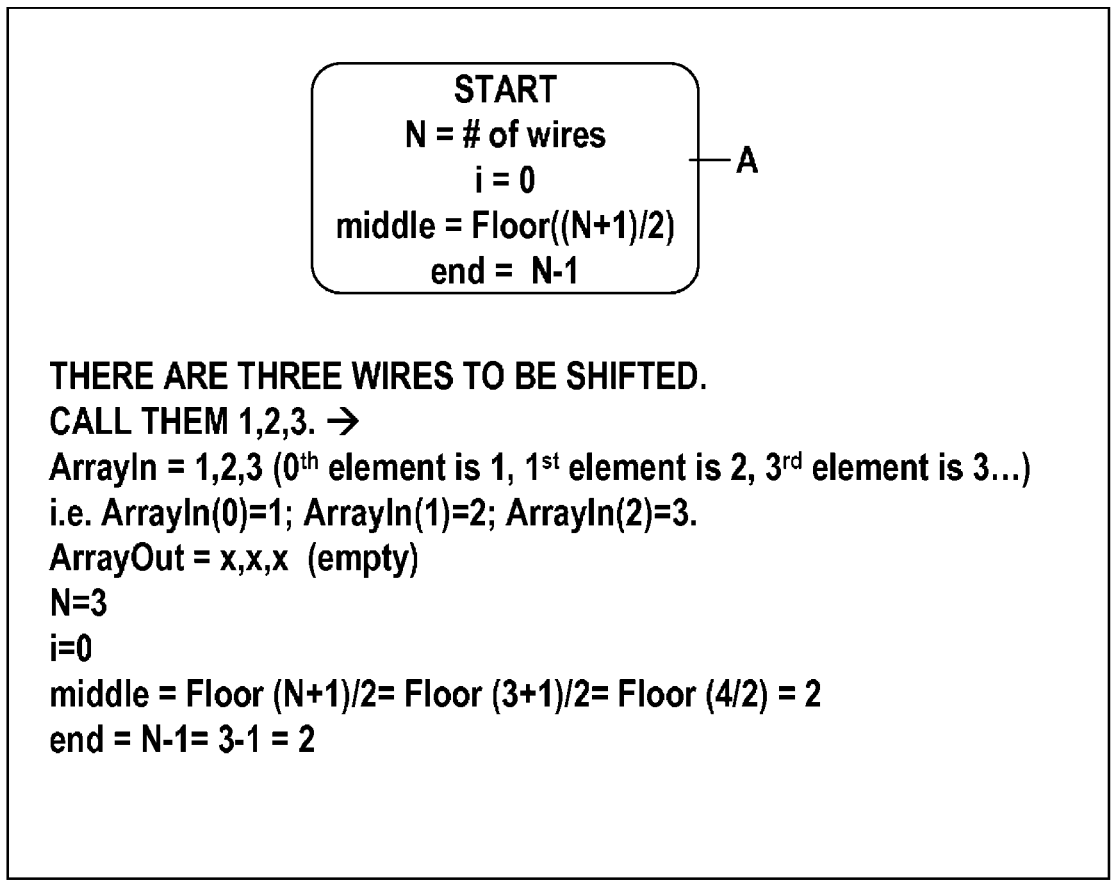
Figure 3C:
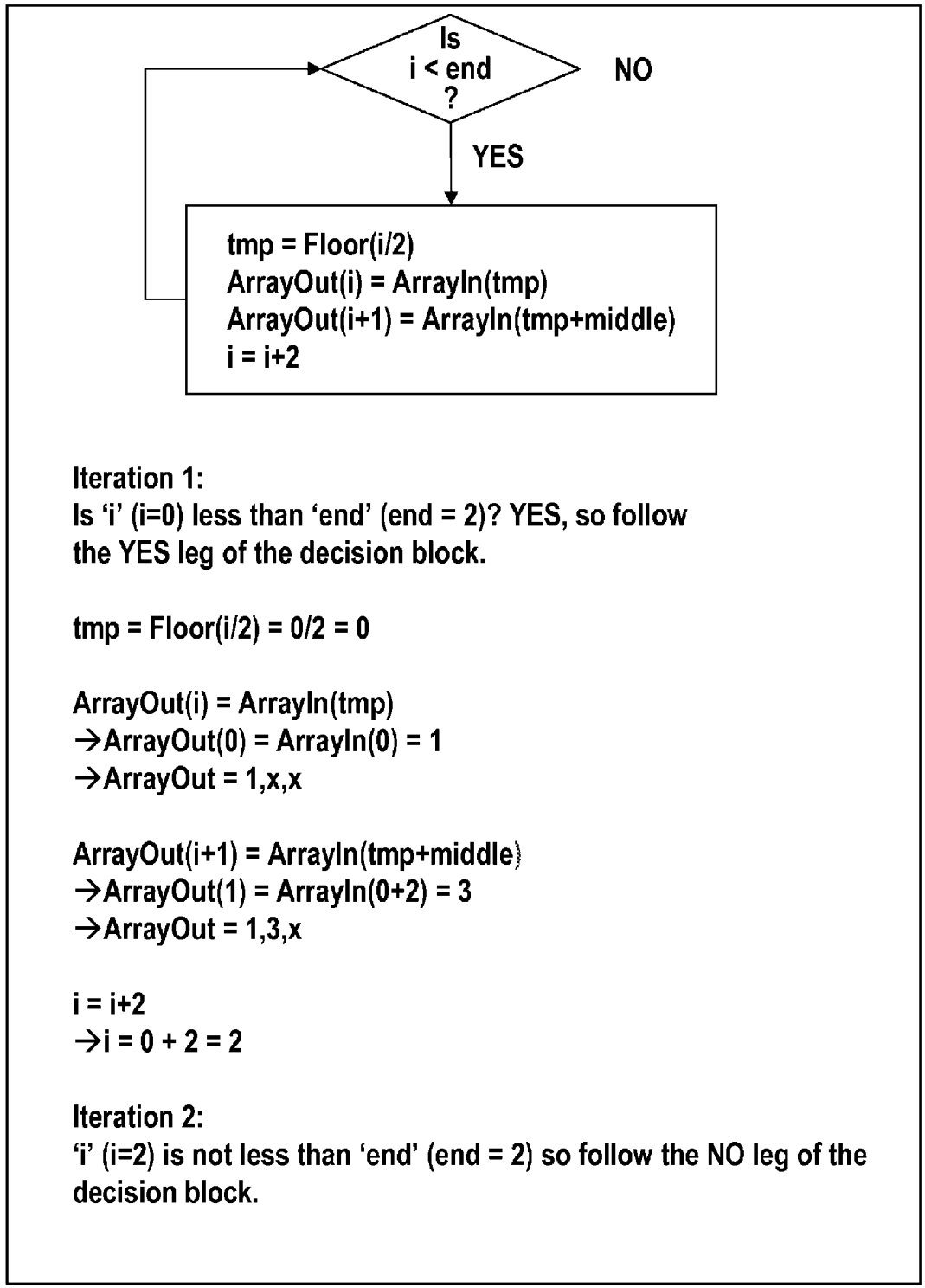

Block A
middle=Floor((N+1)/2);
end=N-1;
Proceed to Block B
  Block B
Then the program tests as to whether the value of "i" is less
  than one less than the number N of wires, i.e. i<(N-1)?
If YES proceed to Block C. If NO proceed to Block D.
  Block C
tmp=Floor(i/2);
ArrayOut(i)=ArrayIn(tmp);
ArrayOut(i+1)=ArrayIn(tmp+middle);
Set i=i+2
Proceed to Block B
  Block D i
=end? If YES, proceed to Block E. If NO, Proceed to Block F.
  Block E
ArrayOut(i)=ArrayIn(middle-1)
Proceed to Block F
  Block F Return ArrayOut Proceed to Block G
  Block G DONE FIGS. 3B-3D show how the algorithm described above is performed for the simple three wire illustrative example of FIGS. 2A and 2B.

Figures 4A, 4B:
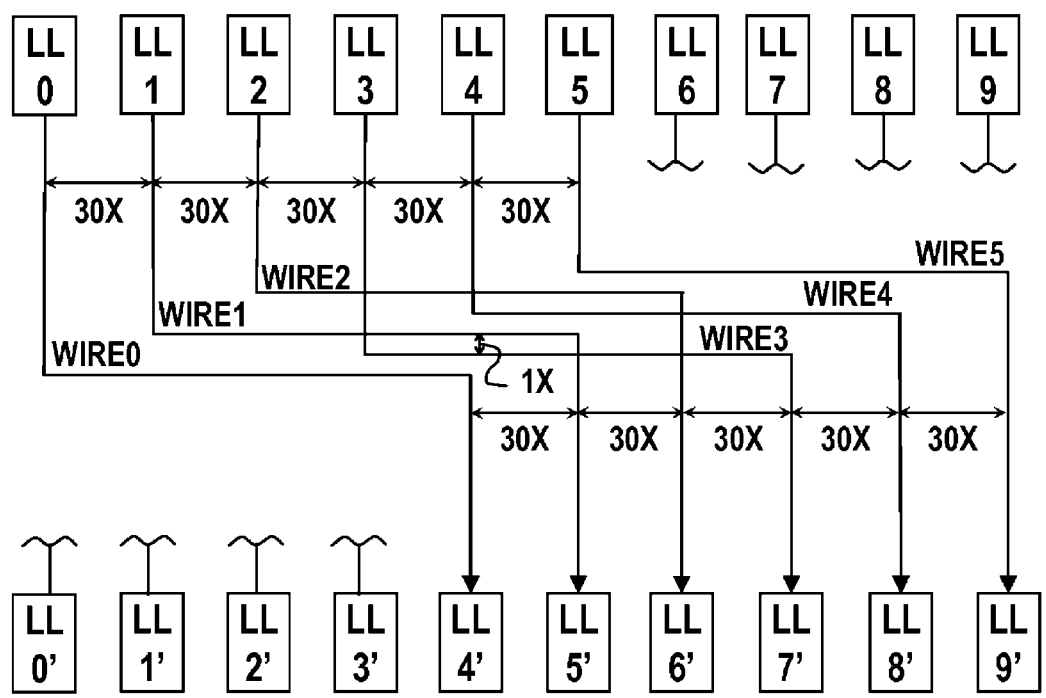
FIGS. 4A and 4B illustrate a six wire example of method of rearranging of wires in a bus that is shifting interconnecting stages of an integrated circuit in accordance with this invention.

FIGS. 4A and 4B show a six wire example of a structure in accordance with this invention which was provided by employing a method in accordance with this invention of rearranging the paths of wires in a bus interconnecting stages of an integrated circuit which is shifting bit lines from left to right in accordance with this invention. As in FIGS. 2A and 2B, the wires from the output terminals to the input terminals have paths which are altered to minimize the proximity of parallel wires between two stages of an integrated circuit device by crossing wires to increase the minimum spacing between horizontal portions of the adjacent wires without changing the sequence of connection of the wires from the input terminals to the output terminals. FIG. 4A is a table illustrating the rearrangement of the paths of the six wires in the bus that is shifting between two stages of an integrated circuit device in accordance with this invention. FIG. 4B illustrates an example of the physical configuration of the busses in the table in FIG. 4A with the sequence of wires WIRE0 to WIRE5 connected respectively from output terminals LL0 to LL5 in the same sequence, i.e. in the same order, to a sequence of input terminals LL4' to LL9', but with the routing of the wires WIRE0, WIRE1, WIRE2, WIRE3, WIRE4, and WIRE5 arranged with paths which provide minimum capacitance therebetween from the input terminals LL0 to LL5 and the set input terminals LL4' to LL9' terminals in accordance with this invention.

In FIG. 4A, there are the six wires WIRE0, WIRE1, WIRE2, WIRE3, WIRE4, and WIRE5 in the bus that are shifting the routing to minimize interwire capacitance. Wires WIRE5 and WIRE0 have only two bit-lengths of coupling, but wires WIRE1-WIRE4 have five bit-lengths of coupling as can be seen by inspection. The process as described in FIG. 3A yields the results shown in FIGS. 4A and 4B. Inspection of FIG. 4B shows the coupling of the six wires in a bus that is shifting from left to right. The horizontal component of WIRE0, which extends from output terminal LL0 to input terminal LL4', is for a very short span a space of 1× away from WIRE 3. The horizontal component of WIRE1, which extends from output terminal LL1 to input terminal LL5', is for two different and longer spans a space of 1× away from both WIRE3 and WIRE2, and WIRE1 crosses WIRE3 at right angles both horizontally and vertically. The horizontal component of WIRE2, which extends from output terminal LL2 to input terminal LL6', is a space of 1× away from both WIRE4 and WIRE5 and WIRE2 crosses WIRE3 and WIRE4 at right angles both horizontally and vertically. The horizontal component of WIRE3, which extends from output terminal LL3 to input terminal LL7', is a space of 1× away from both WIRE1 and WIRE0, and WIRE3 crosses WIRE4 and WIRE5 at right angles horizontally. The horizontal component of WIRE 4, which extends from output terminal LL4 to input terminal LL8', is a space of 1× away from both WIRE2 and WIRE1 and WIRE4 crosses WIRE2 at right angles both horizontally and vertically. The horizontal component of WIRE5, which extends from output terminal LL5 to input terminal LL9', is only a space of 1× away from WIRE 2. The remainder of the wires from terminals LL6 to LL9 have not been shown or described.

Figures 5A, 5B:
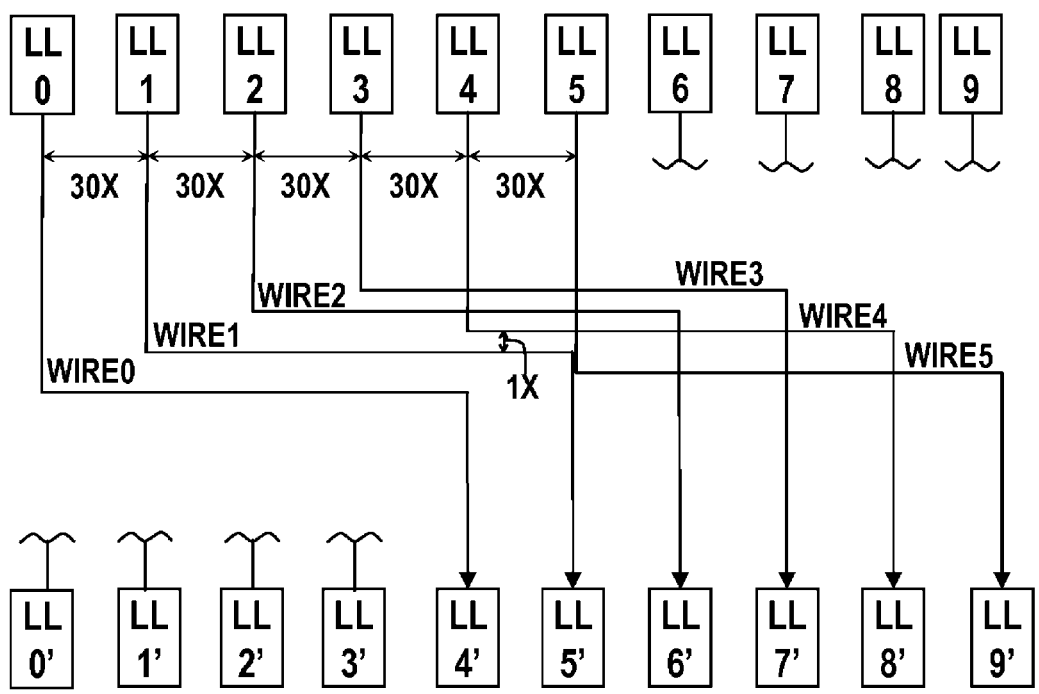
FIGS. 5A and 5B illustrate a six wire example of method of rearranging of wires in a bus that is shifting interconnecting stages of an integrated circuit in accordance with this invention.

FIGS. 5A and 5B illustrate a six wire example of method of rearranging of wires in a bus that is shifting bit lines between interconnecting stages of an integrated circuit in accordance with this invention. In FIGS. 5A and 5B there is a minimum degree of coupling for wires WIRE0 and WIRE5 with higher degrees of coupling for other the other wires from WIRE1 to WIRE 4 in the bus. As in the case of FIG. 4B, FIG. 5B illustrates an example of the physical configuration of the wires in the table in FIG. 5A with the sequence of wires from output terminals LL0-LL5 connected in the same sequence, i.e. in the same order, to input terminals LL4'-LL9', but with the routing of the wires WIRE0, WIRE1, WIRE2, WIRE3, WIRE4,and WIRE5 arranged to provide minimum capacitance therebetween in a modified arrangement in accordance with this invention.

For this algorithm, the largest amount of bit-length coupling capacitance is determined by: $(L-1)*2-1$, and the least amount is determined by: $(L-N+1)*2+1$, where L is the bit-lengths of the shift and N is the number of wires in the bus and always greater than 2. It should be noted that the wire with the most coupled capacitance in the final arrangement has less coupling capacitance than every wire in the prior art arrangement.

When wires in a bus assume the prior art arrangement, the chance of their switching windows which overlap becomes very high. For example WIRE0 and WIRE1 usually switch at the same time whereas WIRE9 (not shown but connected to an output terminal later in the sequence) will switch at a different time. This difference in switching time is due to the physical location of the latches and corresponding clock buffers. That is, the latches and clock buffers associated with WIRE0 and WIRE1 are physically close to one another and therefore incur a similar clock skew. Whereas the latches and clock buffers associated with WIRE0 and WIRE9 (not shown) are physically distant from one another and therefore incur different clock skews. Since coupling capacitance can be exacerbated by neighboring wires switching at the same time, it is thus beneficial to arrange wires in such a way that neighboring wires do not have similar switching windows. The algorithm described in FIG. 3A, and the modification exemplified in FIG. 5 have this advantage.

No more wiring resources are being used in any of these alternatives versus the prior art arrangement, that is, wires are merely being reordered to reduce coupling capacitance thereby improving performance.

GLOSSARY i is a variable that is being incremented and then compared.

Floor is an operator that rounds a number down to an integer; in accordance with floor and ceiling functions.

tmp is a temporary variable middle is a variable that is the middle of the number of wires; the floor of N/2.

tmp=Floor(i/2) This assigns the variable 'tmp' the Floor(i/2)

ArrayOut(i) Array of N wires (indexed as 0 to N−1) ordered sequentially (i.e. 0,1,2,3,4, . . . , N). According to computer protocols, the items in the array are indexed by zero.

ArrayIn(tmp) This is another array called "ArrayIn".

ArrayIn(tmp+middle) We are adding two numbers (tmp and middle hold numbers, like 5, 6 . . . ) and adding them to get some other number (e.g. 11), and then looking at the "tmp+middle-th" box of the array.

ArrayIn(middle−1) Same as above.

Return ArrayOut This function returns the answer to the user.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for forming wires in a bus in an integrated circuit device minimizing coupling capacitance between wires in an array of wires in said bus connected between as output terminal array and an input terminal array, with each of said wires including an output section of said wire connected from an output terminal in said output terminal array to a transverse section of said wire connected to an input section of said wire connected to an input terminal in said input terminal array, formed by the steps as follows:

forming said array of wires in said bus with said output sections and said input sections both arranged in said given sequence in said bus with said bus connecting between said output terminal array and said input terminal array;

forming each said output section of said wires in said bus extending in parallel with each other and each said input section of said wires in said bus extending in parallel with each other;

forming said transverse sections of said wires with at least one of said wires in said bus including a said transverse section crossing over a separate one of said wires in said bus and including a said input section re-crossing over an input section of said separate one of said wires in said bus so that at least one pair of wires with juxtaposed output sections and juxtaposed input sections have transverse sections separated by said one other of said wires in said sequence, and with said transverse sections extending in parallel with others of said transverse sections; and shifting the connections of said wires in said bus between said output terminal array and said input terminal array while retaining the sequence of wires from first to last ones of said output terminals to first to last ones of said input terminals;

whereby aside from said first and last wires in said arrangement, said coupling capacitance across said bus is uniform.

2. The method of claim 1 wherein:

there are N wires in said bus of wires shifting;

employing an algorithm that rearranges the order of said wires to a pattern described by:

For even values of N: 0, (N/2), 1, (N/2)+1, 3, ..., (N/2)−1, N−1;

For odd values of N: 0, Ceiling(N/2), 1, Ceiling(N/2)+1, ..., N−1, Floor (N/2).

3. The method of claim 2 wherein the arranged order is derived by the steps comprising:

START;

N=Number of wires in the bus; i=0; middle=Floor((N+1)/2); end=N−1;

Proceed to Block B;

Block B Then the program tests as to whether the value of i < (N−1)?

If YES proceed to Block C. If NO proceed to Block D;

Block C tmp=Floor(i/2); ArrayOut(i)=ArrayIn(tmp); ArrayOut(i+1)=ArrayIn(tmp+middle); Set i=i+2 Proceed to Block B;

Block D;

i=end? If YES, proceed to Block E. If NO, proceed to Block F;

Block E ArrayOut(i)=ArrayIn(middle−1) Proceed to Block F;

Block F Return ArrayOut Proceed to Block G; and

Block G DONE.

4. A computer program product for minimizing coupling capacitance between wires in a bus comprising a storage medium readable by a processor, capable of performing a method comprising:

forming an array of wires in a bus connected between an output terminal array and an input terminal array, with each of said wires in said bus including an output section connected from an output terminal in said output terminal array to a transverse section connected to an input section connected to an input terminal in said input terminal array by the steps as follows:

forming said array of wires in said bus with said output sections in said bus and said input sections in said bus arranged in a given sequence with said bus connecting between said output terminal array and said input terminal array;

forming each said output section of said wires in said bus extending in parallel with each other, and with each said input section of said wires in said bus extending in parallel with each other;

forming said transverse sections in said bus extending in parallel with others of said transverse sections with at least one of said wires in said bus including a said transverse section crossing over a separate one of said wires in said bus and including a said input section re-crossing over an input section of said separate one of said wires in said bus so that at least one pair of wires with juxtaposed output sections and juxtaposed input sections have transverse sections separated by said one other of said wires in said bus in said sequence, connecting said output terminal array to said input terminal array while retaining said given sequence of wires from first to last ones of said output terminals to first to last ones of said input terminals;

shifting the connections in said bus between said output terminal array and said input terminal array while retaining the sequence of wires from first to last ones of said output terminals to first to last ones of said input terminals;

whereby aside from said first and last wires in said arrangement, said coupling capacitance across said bus is uniform and minimized.

5. The program product of claim 4 wherein:

there are N wires in said bus of wires shifting a bit-length L;

providing an algorithm that rearranges the order of said wires to a pattern described by:

For even values of N: 0, (N/2), 1, (N/2)+1, 3, ..., (N/2)−1, N−1; and

For odd values of N: 0, Ceiling(N/2), 1, Ceiling(N/2)+1, ..., N−1, Floor (N/2).

6. The program product of claim 5 wherein the arranged order is derived by:

START;

N=Number of wires in the bus; i=0; middle=Floor((N+1)/2); end=N−1; Proceed to Block B Block B Then the program tests as to whether i <(N−1)?

If YES proceed to Block C. If NO proceed to Block D;

Block C tmp=Floor(i/2); ArrayOut(i)=ArrayIn(tmp); ArrayOut(i+1)=ArrayIn(tmp+middle); Set i=i+2; Proceed to Block B;

Block D i=end? If YES, proceed to Block E. If NO, proceed to Block F;

Block E ArrayOut(i)=ArrayIn(middle−1) Proceed to Block F;

Block F Return ArrayOut Proceed to Block G;

Block G DONE.

7. An arrangement of wires in a bus in an integrated circuit device that minimizes coupling capacitance between wires in said bus connecting an output terminal array and input terminal array with each of said wires including an output section connected from an output terminal in said output terminal array to a transverse section connected to an input section connected to an input terminal in said input terminal array comprising:

said array of wires including said output sections and said input sections in said bus being arranged in said given sequence in said bus with said bus connecting between said output terminal array and said input terminal array;

wires in each said output section of said bus and being arranged extending in parallel with each other said and wires in each said input section of said bus extending in parallel with each other said input section in said bus;

said transverse sections of said wires being arranged with at least one of said wires including a said transverse section crossing over a separate one of said wires in said bus and including a said input section re-crossing over an input section of said separate one of said wires in said bus so that at least one pair of wires with juxtaposed output sections and juxtaposed input sections has its transverse section separated by said one other of said wires in said sequence, and with said transverse sections extending in parallel with others of said transverse sections;

whereby the paths of said transverse sections of said wires in said bus arranged so that, aside from said first and last wires in said arrangement, coupling capacitance across said bus is uniform and minimized.

8. The arrangement of wires of claim 7 wherein:

there are N wires in said bus of wires shifting a bit-length L;

providing an algorithm that rearranges the order of said wires to a pattern described by: For even values of N: 0, (N/2), 1, (N/2) +1, 3, . . . , (N/2) −1, N −1. For odd values of N: 0, Ceiling(N/2), 1, Ceiling(N/2)+1, . . . , N −1, Floor (N/2).

9. The arrangement of wires of claim 8 wherein the arranged order is derived by:

START

N=Number of wires in the bus; i=0; middle=Floor((N+1)/2); end=N−1;

Proceed to Block B

Block B Then the program tests as to whether the value of "i" is less than one less than the number N of wires, i.e. i <(N−1)?

If YES proceed to Block C. If NO proceed to Block D;

Block C tmp=Floor(i/2); ArrayOut(i)=ArrayIn(tmp); ArrayOut(i+1)=ArrayIn(tmp+middle); Set i=i+2; Proceed to Block B;

Block D i=end? If YES, proceed to Block E. If NO, proceed to Block F.;

Block E ArrayOut(i)=ArrayIn(middle−1); Proceed to Block F;

Block F Return ArrayOut Proceed to Block G;

Block G DONE.

10. A method for minimizing coupling capacitance between generally parallel wires in a bus between input and output terminals of an integrated circuit device comprising:

providing reduced inter-wire capacitance between adjacent wires by way of rearranging the path of a section of a selected portion of a particular one of said wires in said bus;

connecting said wires to said input and output terminals in the same sequence as by rearranging the path of said particular one of said wires in said bus;

whereby said selected portion of one of said wires is located between two previously adjacent wires thereby increasing the space between them aside from said first and last wires in said arrangement, at least one of said wires incurs the smallest possible amount of coupling capacitance and then the coupling capacitance across the rest of said wires in said bus gets progressively worse relative to the original arrangement.

11. The method of claim 10 wherein:

there are N wires in said bus of wires shifting a bit-length L;

providing an algorithm that rearranges the order of said wires to a pattern described by:

For even values of N: 0, (N−1), 1, (N−2), 2, . . . , (N/2)−1, N/2;

For odd values of N: 0, (N−1), 1, (N−2), 2, . . . , Ceiling(N/2), Floor(N/2).

* * * * *